Aug. 11, 1959 W. J. HICKS 2,899,606

TRANSISTOR CONTROLLED GASEOUS INDICATOR CIRCUITS

Filed May 2, 1957

INVENTOR.
WALTER J. HICKS
BY Henry L. Hanson
ATTORNEY

United States Patent Office 2,899,606

Patented Aug. 11, 1959

2,899,606

TRANSISTOR CONTROLLED GASEOUS INDICATOR CIRCUITS

Walter J. Hicks, Cambridge, Mass., assignor, by mesne assignments, to Minneapolis-Honeywell Regulator Company, a corporation of Delaware Application May 2, 1957, Serial No. 656,696

3 Claims. (Cl. 315—135)

Figure 1:
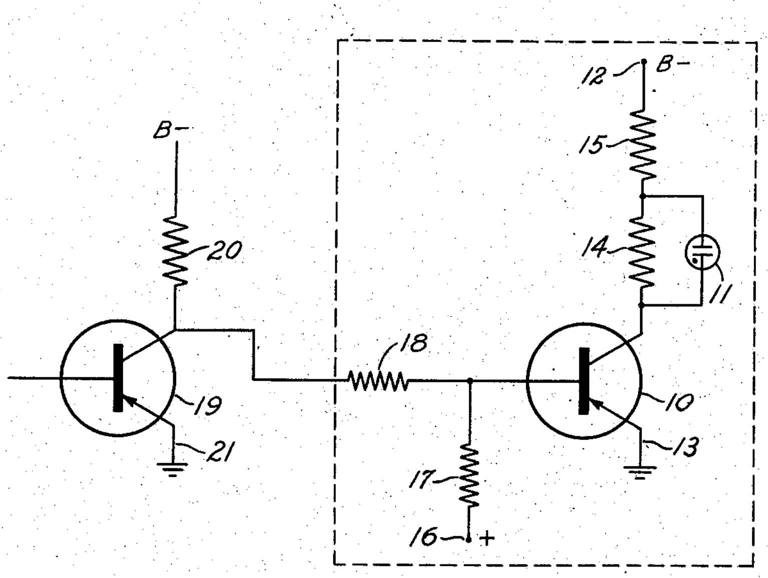

A general object of the present invention is to provide a new and improved indicating circuit for indicating the electrical condition of an associated electrical circuit. More specifically, the invention is concerned with a circuit for operating a gaseous indicator tube where that circuit includes a transistor device used as a switching element in the circuit.

Transistors are readily adapted for use in electrical switching circuits due to the fact that when fully conductive, the transistor internal impedance is very low. Further, when the transistor is switched to be nonconductive, the internal impedance is very high. The association of a transistor device in a switching configuration in combination with a gaseous indicator tube creates a problem for the reason that most indicating tubes of the gaseous type require relatively high operating or firing potentials. These operating potentials are such as to cause a breakdown in the associated transistor if the full supply voltage is applied to the transistor when it is biased to be nonconductive or in the high impedance state. The point of breakdown in the transistor is sometimes referred to as the avalanche point or the punch through point. The over-all effect of applying a voltage to a transistor so that it exceeds the avalanche or break punch through point is to cause a large amount of current to flow through the transistor with the resultant power dissipation therein causing excessive heating which will destroy the transistor.

It has heretofore been proposed to use a transistor as a switch for a gaseous indicator tube where the transistor was positioned in the circuit so that the voltage thereacross never approaches the avalanche point of the transistor. While this type of circuit may be used satisfactorily, it is inherently complicated by the requirement that some of these circuits have two or more separate power supplies in the switching and control circuits such that the circuits become complex, expensive, and difficult to work with on a production basis. Other proposed circuits have required harder driving signals, and components held to very close tolerances. The critical design features of the heretofore known circuits have rendered such circuits of little value in mass production areas particularly as may be found in electronic data processing systems and the like where a large number of points must be maintained under visual observation.

The circuit of the present invention has been arranged so that it requires only two power supply terminals which supply all of the power for the indicating tube and the transistor switching device. The circuit is further arranged so that the current that flows through the transistor when the full supply voltage is applied thereto is less than that which will cause any damage to the transistor even though the avalanche point has been reached.

It is therefore a more specific object of the present invention to provide a new and improved indicating circuit for an electrical device where the gating circuit includes a transistor device and a gaseous indicating tube connected in series to a pair of power supply terminals.

The protection of the transistor in the present invention is achieved by a novel selection of load elements in combination with a gaseous indicating tube such that even though the avalanche point of the transistor may be exceeded, by the use of a power supply circuit whose potential is greater than the breakdown or avalanche potential of the transistor, there will be no resultant damage to the transistor.

It is a further more specific object of the present invention to provide a transistor switch for a gaseous indicator circuit wherein the impedance in the load circuit of the transistor is selected to maintain the current flow to the transistor under conditions of punch through below a magnitude which will cause excessive power dissipation in the transistor.

The foregoing and other features of novelty which characterize the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
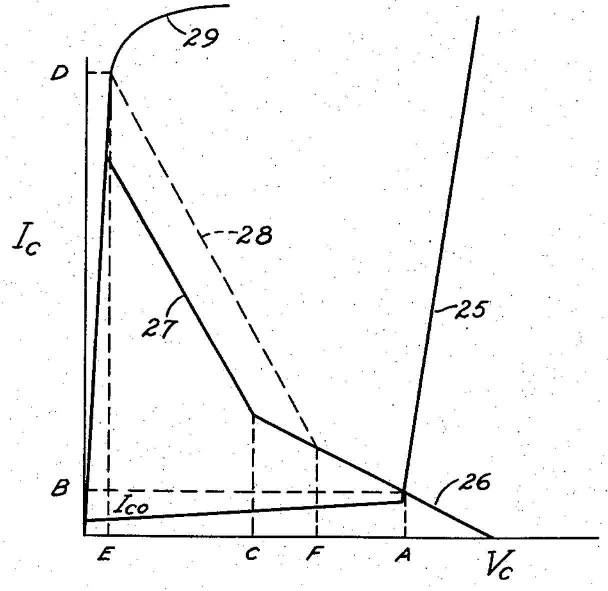

Of the drawings:

Figure 1 is a schematic showing of the preferred form of the present invention; and Figure 2 illustrates graphically the operating characteristics of the circuit of Figure 1.

Referring to Figure 1, the numeral 10 represents a transistor incorporating the usual base, emitter and collector electrodes. The transistor 10 is used in a switching configuration for controlling the firing of a gaseous indicator tube 11. Power is supplied to the indicator 11 and the switching transistor 10 by a pair of power supply terminals 12 and 13, the terminal 12 being connected to a negative potential source and the terminal 13 being a grounded terminal. Connected in series between the collector electrode of the transistor 10 and the supply terminal 12 are a pair of resistors 14 and 15. The indicator tube 11 is connected in parallel with the resistor 14.

The controlling of the switching of the transistor 10 is accomplished by the application of control signals to the base electrode thereof. It will be noted from Figure 1 that a positive bias potential is applied to the base by way of an input terminal 16 and a resistor 17. A further resistor 18 connects the base electrode to a further control element shown here as a further transistor 19, the latter also including the usual base, emitter, and collector electrodes. The collector of the transistor 19 is shown connected to a B minus power supply terminal, whose potential is less than that of the terminal 12, by way of a load resistor 20. The emitter of the transistor 19 is connected to a ground terminal 21. The transistors 10 and 19 are illustrated as PNP transistors. Obviously, the use of NPN transistors would require the reversing of the supply voltage thereto.

Considering the operation of the circuit of Figure 1, it is first assumed that the transistor 19 is conducting so that the left end of the resistor 18 is effectively connected to ground. With the left end of the resistor 18 grounded, the positive potential on the terminal 16 will be applied through resistor 17 to the base electrode of the transistor 10 and the transistor 10 will be biased into its nonconducting region. With transistor 10 nonconducting, its impedance will be relatively high. With the impedance high, the voltage drops in the circuit are such that the voltage across the resistor 14 will be below the magnitude necessary to cause a breakdown of the indicator tube 11 and the tube will be extinguished. With substantially no current flowing through the resistors 15 and 14 due to the high impedance of the transistor 10 in the emitter-collector circuit, the entire potential of the power supply will begin to appear across the emitter-collector circuit of the transistor. Transistors presently available are all subject to breakdown, under the above described conditions, when an excessively high voltage is applied to the emitter-collector circuit. The present circuit is arranged to eliminate any adverse effects which might occur due to the fact that the avalanche point or punch through point has been exceeded. It will be noted that if the avalanche point is reached in the transistor 10 that a current will begin to flow in the transistor. However, the sizes of the resistors 14 and 15 are so selected that the resultant voltage drop across these resistors will limit the current through the transistor and consequently the power dissipation in the transistor will be less than that which would have an adverse effect upon the operation of the device.

When it is desired to operate the transistor in a low impedance state, the transistor 19 will be biased into its nonconducting state so that the left end of the resistor 18 will tend to approach the B minus potential on the upper terminal of the resistor 20. This bias potential will bias the transistor 10 at its base electrode into the negative region where the transistor 10 will become conducting in the emitter-collector path. When conducting, the impedance of the emitter-collector path is very low and consequently substantially the full supply voltage now appears across the resistors 14 and 15. With the indicator tube 11 connected in parallel with the resistor 14 and with the increase in the potential thereacross, the tube 11 will fire. The tube will continue to fire until the transistor 10 is again switched into the high impedance state. When switched to the high impedance state, the potential drop across the resistor 14 will be below that value necessary to maintain the tube 11 in the conducting or indicating state.

The operation of the circuit of Figure 1 can be considered more specifically with respect to the graphical presentation of Figure 2, the latter figure illustrating the characteristic curves critical to the operation of the transistor 10 in its associated switching circuit with the indicator tube 11. In Figure 2, the curve 25 represents the $I_{C0}$ curve of the transistor 10 when the transistor is biased into the nonconducting region. It will be noted that as the collector voltage is increased, there will be a slight increase in the collector current $I_C$. As soon as the collector voltage has increased to a predetermined point, there will be a breakdown or a punch through such that the collector current will increase very rapidly with a small increase in the collector voltage. Normally, the increased current will cause a power dissipation sufficient to destroy the transistor.

The combined impedance in the load circuit of the transistor 10 is represented by the load line 26 and this load line 26 is arranged to cross the $I_{C0}$ curve 25 at or near the punch through or avalanche point of the transistor 25 at point A on the $V_C$ axis.

With the load line 26 crossing the $I_{C0}$ line 25 as illustrated, the collector current $I_C$ will never go above the value B along the curve 25 as indicated on the $I_C$ axis.

As the current flow in the collector circuit is limited, the resultant power dissipation in the transistor 10 will be below that point which can cause any damage to the transistor 10 even though it may be operating in the avalanche region. The operation in the avalanche region as indicated will not cause any shift in the transistor characteristics and consequently may be operated as a normal switching device with no adverse effects on the length of the life of the over-all circuit.

When it is desired to switch the indicator 11 into the indicating state, it will be noted that the load line 26 will remain with a substantially fixed slope until such time as the gas tube 11 fires as indicated at point C on the $V_C$ axis. At this point, the impedance of the gas tube operating in parallel with resistor 14 is effective to shift the load line to that indicated by the line 27. Substantially instantaneously after the firing of the tube 11, the effective load line will shift to the line indicated by the dotted line 28. The collector current now flowing may be determined by noting the point at which the load line 28 intersects the operating curve 29, the latter occurring at point D. The collector voltage under these circumstances will be represented by the point E on the characteristic curve.

It will thus be seen that the transistor is switched from its nonconducting state, when the voltage thereacross is at point A, to point C. Then, the voltage across the indicator tube 11 will have risen to a point where the tube 11 will fire and the voltage will then stabilize out with the collector voltage now being at point E. The balance of the supply voltage appears across the resistors 14 and 15 as well as the indicator tube 11.

When it is desired to switch the tube off, the load line 28 will be the effective load line and as soon as it reaches the point F on the collector voltage axis, the voltage across the indicator tube 11 will have dropped to a point where the tube will no longer be conducting and the discharge therein will accordingly be extinguished. The tube will then remain extinguished and the circuit will then come to rest at the point A where the load line 26 crosses the $I_{C0}$ line 25.

In a preferred embodiment of the invention, the transistor used was a type known commercially as the GT 34HV. The indicator tube 11 was an Ne-2 neon indicator tube selected to have a maximum firing voltage of approximately eighty volts and a minimum extinguishing voltage of approximately fifty volts. The resistor 14 was selected to have a magnitude of 1 megohm and the resistor 15 was selected to have a magnitude of 100 k. The voltage used on the supply terminals 12 and 13 was 100 volts. The input to the transistor 10 was arranged with the resistor 17 having a magnitude of 15 k. and the potential on the biasing terminal 16 being a plus 1.5 volts. The resistor 18 was selected to have a resistance of 8.2 k. and was arranged so that the potential on the input of the resistor 18 was varied between 0 and minus 1.5 volts due to the switching action of a switching device, such as a transistor 19.

It should be understood that the foregoing recited values are representative only of one embodiment and as will be apparent to those skilled in the art, numerous other values may be used in order to realize the full advantages of the present invention.

While, in accordance with the provisions of the statutes, there has been illustrated and described the best form of the invention known, it will be apparent to those skilled in the art that changes may be made in the forms of the apparatus disclosed without departing from the spirit of the invention as set forth in the appended claims, and that in some cases, certain features of the invention may be used to advantage without a corresponding use of other features.

Having now described the invention, what is claimed as new and for which it is desired to secure by Letters Patent is:

1. A circuit for controlling the operation of a visual indicator element in the form of a gaseous indicator tube having a predetermined firing potential comprising a pair of power supply terminals adapted to have thereon a potential greater than said firing potential, a pair of series connected fixed resistors, a switch comprising a transistor device having a base electrode, emitter electrode and collector electrode, circuit means connecting said pair of resistors and the emitter-collector electrode circuit in series between said pair of power supply terminals, said emitter-collector electrode circuit impedance, when biased to be nonconductive, and the impedance of said series connected resistors being selected so that the current flow through emitter-collector circuit of said transistor will be less than that which will damage said transistor even though the breakdown potential thereof has been exceeded, means directly connecting one terminal of said gaseous indicator tube to the junction point of said series connected resistors and the other terminal of said gaseous indicator tube to an electrode on said transistor in said emitter-collector electrode circuit, and a control signal circuit connected to the base electrode of said transistors, said control signal circuit being adapted to switch the impedance of said emitter-collector electrode circuit from a relatively high value to a substantial short circuit.

2. A circuit for controlling the operation of a gaseous indicator device having a predetermined firing potential comprising a pair of power supply terminals adapted to have thereon a potential greater than said firing potential, a pair of series connected fixed resistors, one of which has a gaseous indicator device in parallel therewith, a switch comprising a transistor device having a base electrode, emitter electrode and collector electrode, circuit means connecting said pair of resistors and the emitter-collector electrode circuit in a direct series circuit between said pair of power supply terminals, said emitter-collector electrode circuit impedance, when biased to be nonconductive, and the impedance of said series connected resistors being selected so that the current flow through the emitter-collector electrode circuit will be less than that which will damage said transistor even though the breakdown potential thereof has been exceeded, a biasing potential terminal connected to said base electrode, a third resistor connected in series with said base electrode, and switch means connected to said biasing potential and to said base electrode by way of said third resistor to switch the effect of said biasing potential on said base electrode and thereby the impedance of said emitter-collector electrode circuit.

3. A circuit as defined in claim 2 wherein said switch means comprises a second transistor having a base electrode, emitter electrode, and collector electrode and the emitter-collector electrode circuit of said second transistor is connected in a series circuit with the base electrode of said first named transistor.

References Cited in the file of this patent

UNITED STATES PATENTS

| | | |
|---|---|---|
| 2,492,343 | Zavales | Dec. 27, 1949 |
| 2,679,617 | Mullaney et al. | May 25, 1954 |
| 2,761,965 | Dickinson | Sept. 4, 1956 |
| 2,765,426 | Faulkner | Oct. 2, 1956 |
| 2,772,410 | Logue et al. | Nov. 27, 1956 |
| 2,776,420 | Woll | Jan. 1, 1957 |
| 2,849,622 | Gridley | Aug. 26, 1958 |

OTHER REFERENCES

"Decade Counter Employs Silicon Transistors," by Paul Krenitsky, Electronics, August 1955, pp. 112, 113.